Sept. 29, 1931.    W. DUBILIER    1,824,805
ELECTRICAL CONDENSER
Filed March 19, 1926
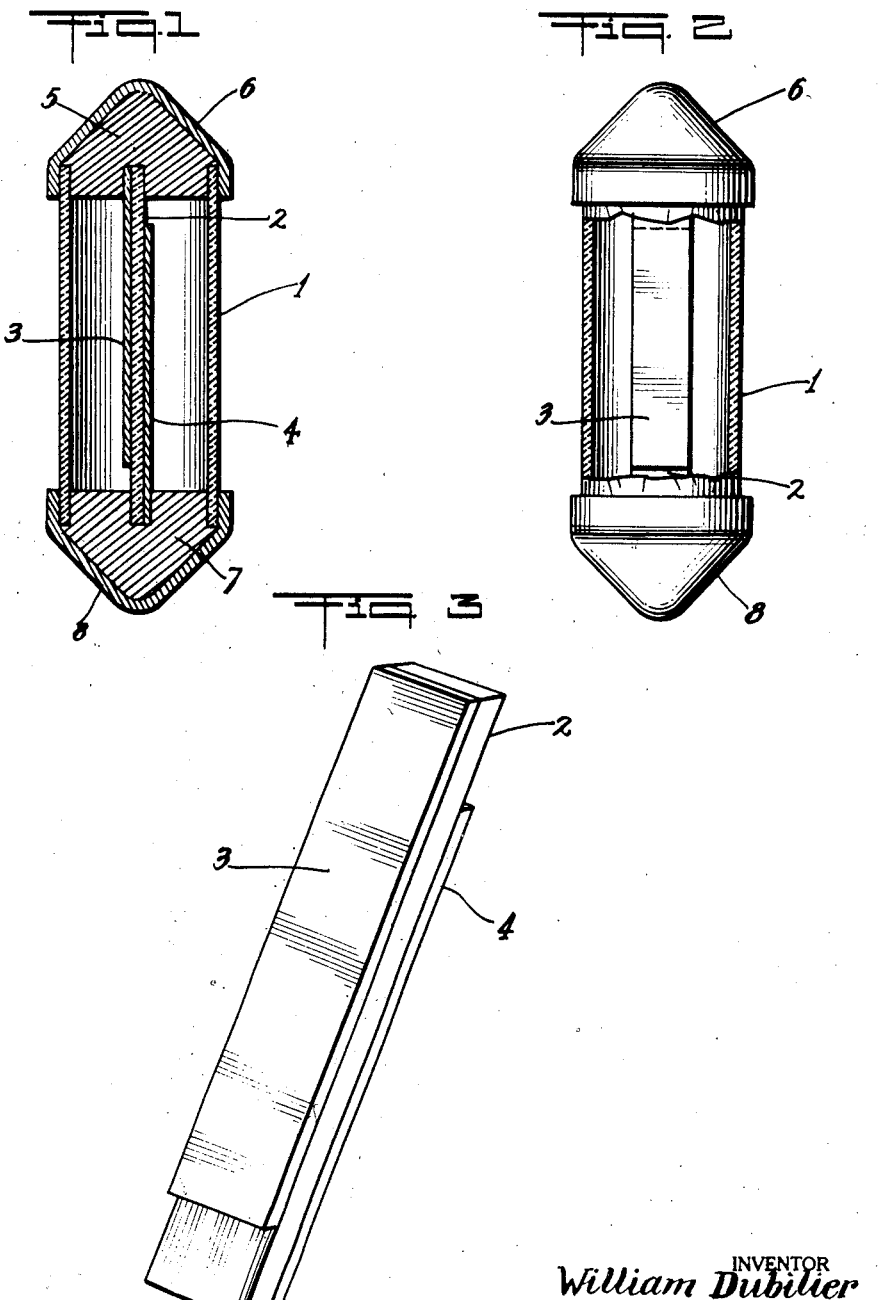
INVENTOR
William Dubilier
BY
William F. Nickel
ATTORNEY Patented Sept. 29, 1931

1,824,805

UNITED STATES PATENT OFFICE

WILLIAM DUBILIER, OF NEW ROCHELLE, NEW YORK, ASSIGNOR TO DUBILIER CONDENSER CORPORATION, OF NEW YORK, N. Y., A CORPORATION OF DELAWARE

ELECTRICAL CONDENSER

Application filed March 19, 1926. Serial No. 96,096.

My invention relates to an improvement in electrical condensers; particularly, electrical condensers in which a fixed or constant electrostatic capacity is desired.

An object of the invention is to provide a condenser in which the conductive elements are well housed, and which is at the same time constructed so that it can easily be handled without much risk of breakage and which is of such design that it can be quickly and cheaply manufactured.

Further objects and advantages will be set out in the following description and the novel features of the invention pointed out in the appended claims; but changes in details may be made without departing from the principle by which the invention is controlled.

On the drawings,

Figure 1 is a sectional view through a condenser according to my invention;

Figure 2 is a side view partly broken away to show the interior; and

Figure 3 is a perspective view showing the body of the condenser comprising the conductive elements insulated from each other which give the electrostatic effects.

The same numerals identify the same parts throughout.

The numeral 1 indicates a tubular sleeve which may be of insulation such as glass, fibre, or any other suitable material. Inside of this sleeve is a member of insulation 2, which is in the form of a bar of glass or some other suitable substance. On one face of the member 2, is a sheet or element of conductive material 3, and on the opposite face is a similar sheet 4. The sheet 3 is flush with one end of the member 2, but terminates short of the opposite end; while the sheet 4 is flush with said opposite end, but terminates short of the first-named end of the member 2.

The sheets 3 and 4 can be attached to the insulating member 2 in any suitable manner as by an adhesive or, should insulating strip 2 be composed of plastic material, by compressing the member 2 and the sheets 3 until they adhere to one another. One extremity of the member 2 with the sheet of conductive material flush with said extremity, such as the sheet 3, for instance, is then embedded in some conductive material such as solder 5, filling one end of the sleeve 1; while the other extremity of the member 2 with the sheet of conductive material which is flush with that extremity, such as the sheet 4, is then embedded in solder 7. The solder shown at 5 and the solder shown at 7 fill and close the two ends of the tubular sleeve 1, and to the outside of this sleve 1 on the extremities thereof, are fitted caps 6 and 8. The solder at one end of the tubular sleeve thus engages the extremity of one of the conductive elements on the member 2, such as the element 3, and acts to hold the adjacent end of the member 2 and the cap closing the adjacent end of the sleeve 1, in permanent union, binding this cap to the sleeve and also affording electrical connection of the element 3 and cap 6; while the solder in the opposite end of the sleeve 1 serves the same purpose, binds the cap on said opposite extremity in place, and establishes contact between said cap and the other element 4. At the same time, the element 3 does not extend from the solder 5 to the solder 7 and the element 4 does not extend from the solder 7 to the solder 5. Therefore, if the two terminals of an electric circuit are connected to the cap 6 and 8, the elements 3 and 4 each of which is joined to one terminal of said circuit, will operate as a condenser in the manner desired.

This type of condenser thus has the same shape as the well-known grid leak resistance and the body of the condenser comprising the conductive elements 3 and 4 with insulation between them can, of course, be made in various ways and of any size to give the required capacity.

The ends of the elements 3 and 4 which are not embedded in the solder can be cut off at various points to regulate the capacity and these sheets 3 and 4 can be large or small as conditions demand. Likewise, the sheets 3 and 4 instead of being laid flat against the member 2 can be wrapped around it, so long as they are suitably insulated from each other.

Having described my invention, what I believe to be new and desire to secure and protect by Letters Patent of the United States is:—

1. A condenser comprising a tubular sleeve, an insulating member therein, conductive elements carried by said member, an end of each element extending beyond the adjacent end of the other toward an end of said insulating member, and means engaging the ends of said member and one end of each of said elements to enable the condenser to be connected in circuit.

2. A condenser comprising a tubular sleeve, an insulating member in each sleeve, conductive elements mounted on said member, each of said elements having one end flush with one end of said member, but terminating short of the opposite end, said elements each extending at one end beyond the adjacent end of the other element, solder filling each end of said sleeve and engaging the two extremities of said member, the solder at one end engaging the extremity of one of said elements, and the solder at the opposite end engaging the extremity of the remaining element, and conductive caps for the end of the sleeve, the solder holding said caps in place and establishing electrical connection between each of said caps and one of said elements.

3. An electrical condenser comprising a housing having openings therein, closure means for the housing, supporting means for the condenser armatures of opposite polarity extending between and secured to the closure means, said supporting means separating the armatures and comprising the dielectric element of the condenser.

4. An electric condenser comprising an open-ended housing, closure means for each end of the housing, a supporting member for the condenser armatures of opposite polarity, the supporting member extending between and supported by said closure means, the supporting means also separating the armatures and comprising the dielectric element of the condenser.

5. An electrical condenser comprising an open-ended housing, closure means for the housing serving as terminals for the condenser, a supporting member for the condenser armatures extending between and supported solely by said closure means, said member also separating the armatures and comprising the dielectric element of the condenser.

In testimony whereof I affix my signature.

WILLIAM DUBILIER.